(12) United States Patent
Thompson

(10) Patent No.: US 7,296,135 B2
(45) Date of Patent: Nov. 13, 2007

(54) DATA MISALIGNMENT DETECTION AND CORRECTION IN A COMPUTER SYSTEM UTILIZING A MASS STORAGE SUBSYSTEM

(75) Inventor: Mark J. Thompson, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 274 days.

(21) Appl. No.: 11/243,716

(22) Filed: Oct. 5, 2005

(65) Prior Publication Data

US 2007/0079105 A1   Apr. 5, 2007

(51) Int. Cl.
*G06F 12/00* (2006.01)
*G06F 12/16* (2006.01)

(52) U.S. Cl. ........................ 711/201; 711/114

(58) Field of Classification Search ............ None
See application file for complete search history.

(56) References Cited

U.S. PATENT DOCUMENTS

| | | | | |
|---|---|---|---|---|
| 5,956,745 A * | 9/1999 | Bradford et al. | ............ | 711/137 |
| 6,484,235 B1 * | 11/2002 | Horst et al. | .................. | 711/114 |
| 6,591,339 B1 * | 7/2003 | Horst et al. | .................. | 711/114 |
| 6,931,499 B2 * | 8/2005 | Delaney et al. | ............. | 711/154 |
| 2005/0251508 A1 * | 11/2005 | Shimizu | ........................ | 707/2 |

* cited by examiner

*Primary Examiner*—Kevin Verbrugge

(57) ABSTRACT

An embodiment of a data misalignment correction method for a mass storage drive array subsystem coupled to a computer operating system having input/output data block requests is provided. The data misalignment correction method includes automatically determining an amount of misalignment between a requested data block and a current data block alignment configuration, using the amount of misalignment to determine a preferred data bock alignment and realigning data block requests on the mass storage device according to the preferred data block alignment.

30 Claims, 11 Drawing Sheets

DATA MISALIGNMENT DETECTION AND CORRECTION IN A COMPUTER SYSTEM UTILIZING A MASS STORAGE SUBSYSTEM

BACKGROUND

Redundant Array of Inexpensive Disks (RAID) is commonly used with n drives grouped together. With this RAID system, the effective data transfer rate is increased n times. This technique is called "striping," which originated in the supercomputing environment where the transfer of large amounts of data to and from secondary storage is a frequent requirement. With this approach, the end physical drives become one or more logical volumes and may be implemented either through hardware or software.

The configuration of physical drives that comprise the RAID drive array is transparent to the computer operating system. Instead, the host computer operating system addresses the striped data in the drive array by logical volume and logical block number. Each logical volume includes one or more strips of data. Logical blocks belonging to several logical volumes might use one physical drive. The host operating system requests logical blocks from the drive array using a block size that it has determined to be the most efficient for itself. The RAID subsystem accepts block requests from the operating system and maps the requests to the appropriate physical drive, and further to a physical block on that drive.

In the most efficient configuration, the block size used by the operating system would match the RAID strip size. In addition, the alignment of the start of the operating system data would fall exactly on a strip boundary. In this configuration incoming requests from the operating system map most closely with the strips of data managed by the RAID subsystem, avoiding any additional strip accesses which would occur if the operating system block request unnecessarily crossed over a strip boundary. This unnecessary additional physical drive access can result in as much as a 50% performance loss.

SUMMARY

An embodiment of a data misalignment correction method for a mass storage drive array subsystem coupled to a computer operating system having input/output data block requests is provided. The data misalignment correction method includes automatically determining an amount of misalignment between a requested data block and a current data block alignment configuration, using the amount of misalignment to determine a preferred data bock alignment and realigning data block requests on the mass storage device according to the preferred data block alignment.

DETAILED DESCRIPTION OF PREFERRED EMBODIMENT

In the following description, reference is made to the accompanying drawings, which form a part hereof, and in which is shown by way of illustration a specific example in which embodiments of the invention may be practiced. It is to be understood that other embodiments may be utilized and structural changes may be made without departing from the scope.

In general, since operating systems are free to choose their own block sizes and RAID systems can have default or improperly chosen strip sizes, in one embodiment of the present invention, the selection of the most efficient RAID configuration that could be used to improve the performance of a mass storage drive array subsystem is determined automatically and used to reconfigure the RAID subsystem thereby decreasing the number physical drive accesses performed.

Figure 1:
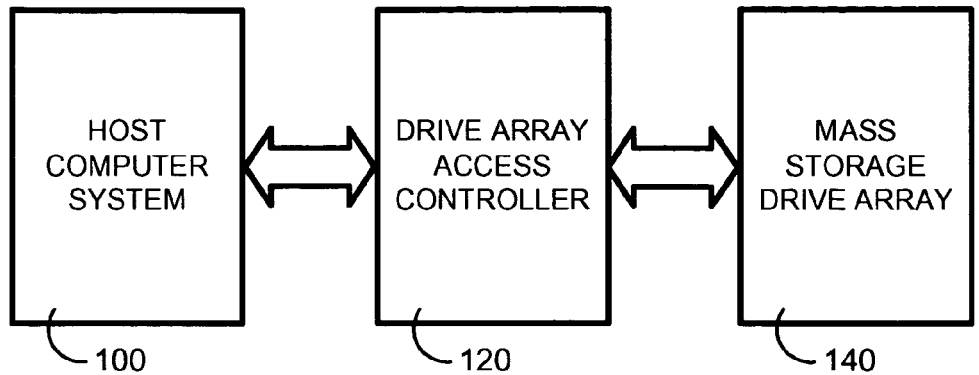
FIG. 1 is a flow diagram of one embodiment of the invention.

FIG. 1 is a flow diagram relating to one embodiment of the present invention and depicts a host computer system 100 interfaced with a drive array access controller 120, which is interfaced to mass storage drive array 140. One embodiment of the present invention relates specifically to drive array access controller 120, which can be hardware, software, or a combination of both. Also, the functionality of existing drive array access controller 120 systems can be improved.

Figure 2:
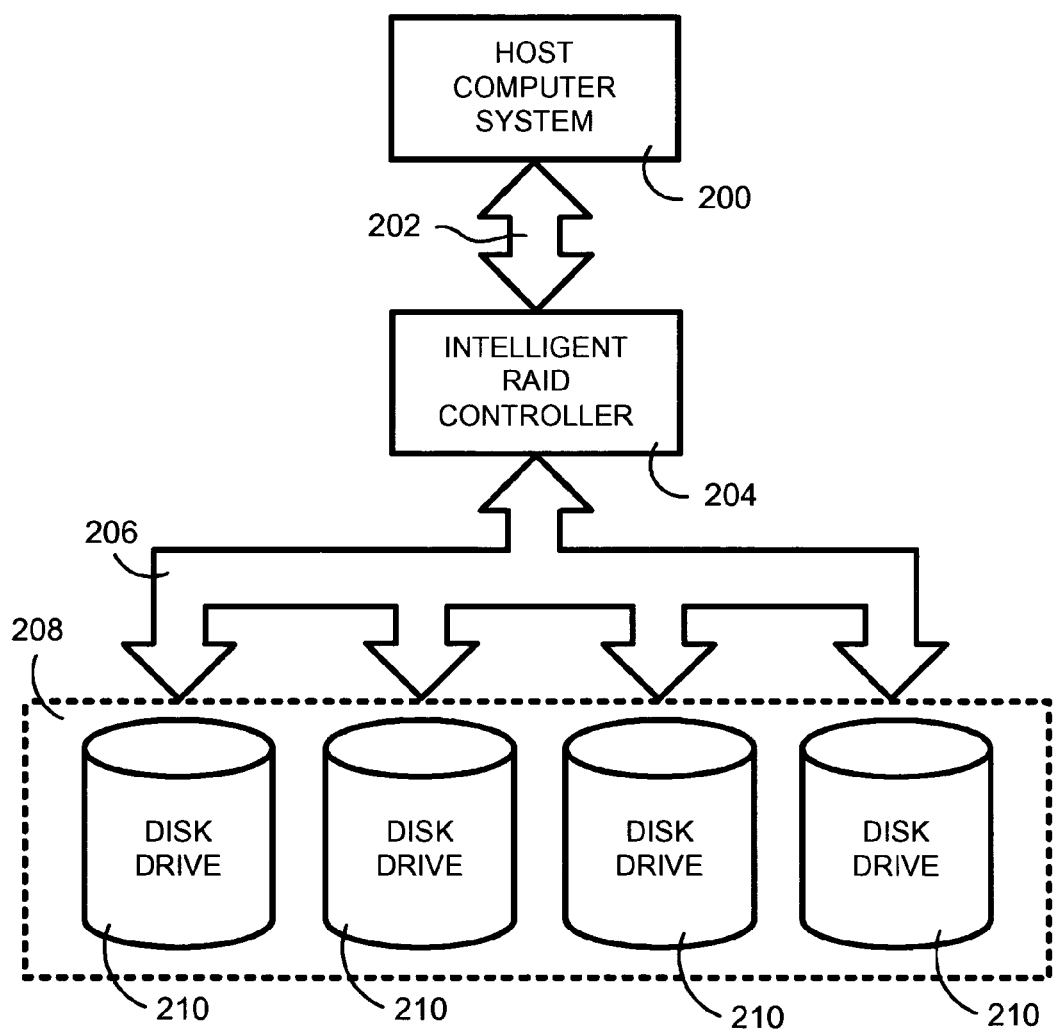
FIG. 2 is a block diagram of one embodiment of the invention, which is further detailed in FIGS. 3 through 9.

FIG. 2 is a block diagram illustrating a computer system incorporating one embodiment of the present invention. Shown in FIG. 2 is a host computer system 200 interfaced with an intelligent RAID disk controller 204 with attached drive array 208. Interface bus 202 is the communications channel by which the host computer system exchanges information with the RAID controller and can be a Peripheral Component Interconnect (PCI), Industry Standard Architecture (ISA), Extended Industry Standard Architecture (EISA), Accelerated Graphics Port (AGP), Personal Computer Memory Card International Association (PCMCIA) bus, or others, and is assumed to be a PCI bus for this discussion. Intelligent RAID controller 204 can be implemented completely in software, integrated into the host computer system, as an add on card such as a PCI, EISA, AGP, PCMCIA card or others, or in any other suitable form, and is assumed to be a PCI card for this discussion.

As shown in FIG. 2, RAID controller 204 has an additional interface bus 206, which is the communications channel it uses to communicate with drive array 208. Interface bus 206 can be a Small Computer Systems Interface (SCSI), Advanced Technology Attachment (ATA), Enhanced Integrated Device Electronics (EIDE), Universal Serial Bus (USB), FireWire, Fiber Channel (FC), or others, and is assumed to be a SCSI bus for this discussion. Drive array 208 is an array consisting of 1 or more rewritable mass storage devices 210. These mass storage devices can be hard drives, optical drives, Compact Disk (CD) drives, Digital Versatile Disc (DVD) drives, tape drives or others, and are assumed to be hard drives for this discussion.

It should be noted that the RAID controller 204 is a bridge between the host computer system 200 and the drive array 208, and the host computer system preferably does not access drive array 208 directly. When using a RAID controller, the host computer system normally stores data on RAID logical volumes. In other words, the RAID controller 'hides' the physical drives from the host computer system and instead presents a virtual storage device to the host computer system. As far as the host computer system is concerned, the virtual storage device can be accessed as if it were a physical storage device.

The ability of the RAID controller 204 to present an array of drives as a one or more virtual drives to the host computer system 200 is typically implemented by 'firmware' on the RAID controller 204. Firmware is the software program that gets executed by a microprocessor on the RAID controller 204. It is this firmware that handles the communications with the host computer system 200 as well as the communications with the drive array 208. Since the host operating system sees the drive array as a 'virtual' drive, one of the responsibilities of the firmware would be to handle the mapping of operating system data requests into corresponding data request to the drive array 208. For example, in response to an operating system request for a block of data, the RAID firmware may need to make multiple requests to the drive array, possibly spanning across multiple physical drives, and return the results back to the host computer system 200.

Figure 3:
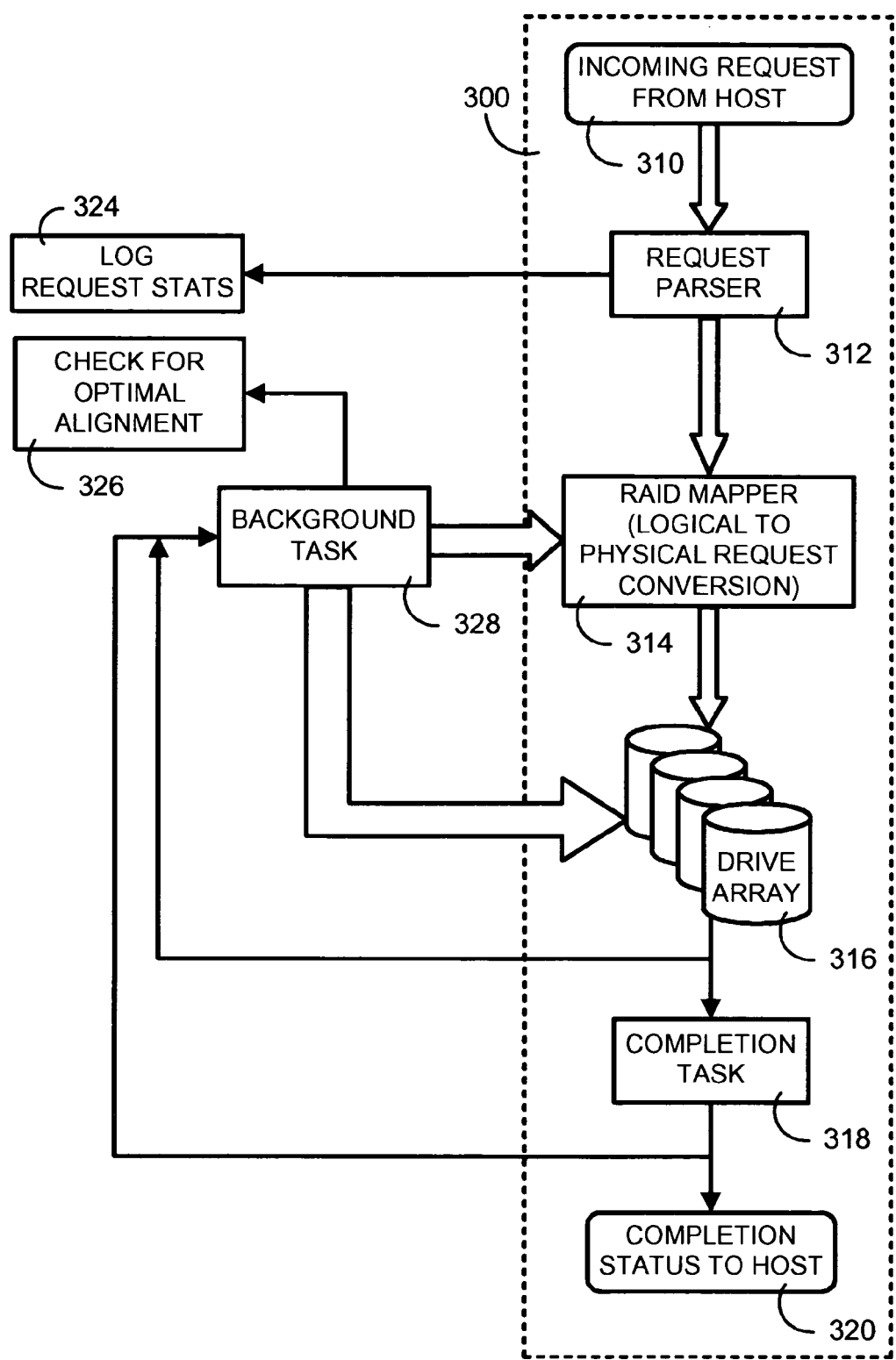
FIG. 3 is a block diagram representing the firmware tasks associated with one embodiment of the present invention, which is further detailed in FIGS. 7 and 8A and 8B.

FIG. 3 is a flow diagram representing the firmware of the RAID controller of the present embodiment. The embodiments of the present invention can build upon existing established techniques used in typical RAID controllers. Section 300 of FIG. 3 depicts a flow diagram with step-by-step logic of the firmware associated with the RAID controller of one embodiment of the present invention that includes processing requests from the host. Incoming requests from the host (step 310) are received by the RAID controller and submitted to the request parser (step 312). The request parser then passes the request on to the to RAID Mapper (step 314). The RAID Mapper in step 314 does the logical to physical request conversion and will then generate and issue any command(s) to the physical drive array (step 316). Upon completion of the command(s) issued to the physical drive array (step 316), the status result is determined by the completion task module (step 318) and returned to the host (step 320). It is the efficiency of the processing of these requests from the host that embodiments of the present invention addresses and improves upon.

An operating system typically stores and retrieves from a storage device in the form of data blocks. This usually occurs whether the storage device is a physical drive or a virtual drive, as would be the case when using a RAID controller with multiple drives. Although 512 bytes are a common block size, it is common for operating systems to store data on storage media in larger OS-native block sizes, for example the Microsoft Windows XP™ operating system commonly stores data in 4 KB or 16 KB blocks, starting at the beginning of the operating system data area. The size of most read or write commands issued by the OS will be a multiple of the OS block size. The operating system data area may be offset from the beginning of a storage device due to partitioning information, which is normally stored at the beginning of the drive. The length of this partitioning information is independent of the OS block size.

Figure 4:
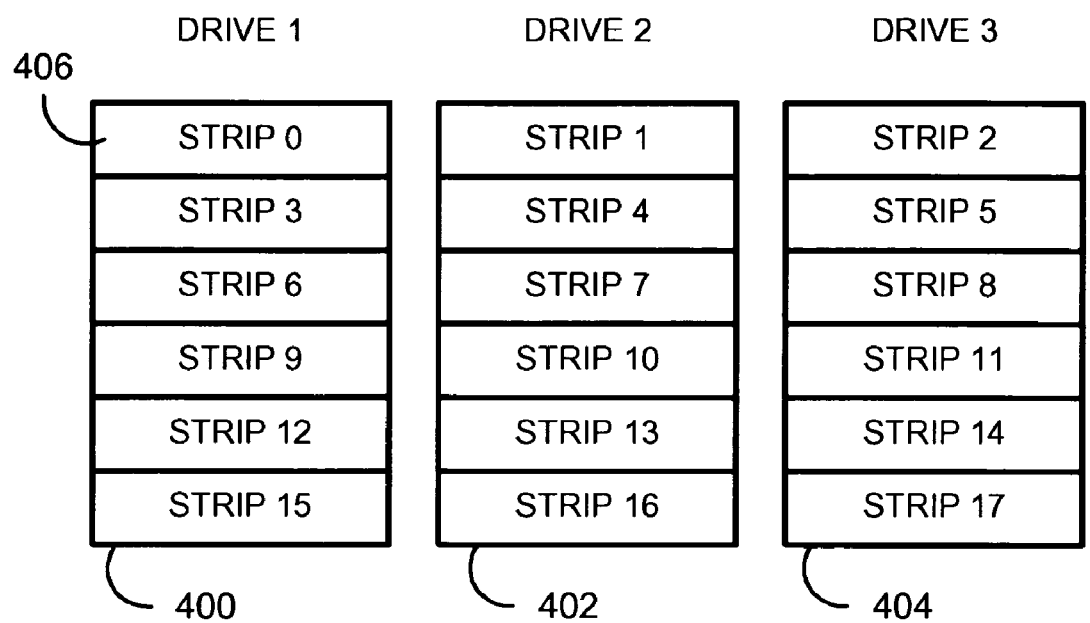
FIG. 4 depicts how a typical operating system arranges data blocks on a storage device.

Referring to FIG. 4, the organization of data of a RAID drive array is depicted, which in this example consists of three drives. As shown in FIG. 4, data is stored on the each of the three drives: 400, 402 and 404 in strips 406. Each strip can be further subdivided into logical blocks, which include one or more physical disk sectors. Each strip of data is normally a size in bytes that is a power of 2, typically 16 KB or 64 KB but generally in the range between 2 KB and 128 KB. Physical disks sectors are commonly smaller in size, such as 512 bytes. Thus, if for example, if the strip size were 16 KB then strip 0 of drive 1 400 would represent RAID logical blocks 0-31, and strip 1 on drive 2 402 would represent RAID logical blocks 32-63, etc.

When the host computers operating system (OS) data is stored on a RAID logical volume, the OS is frequently oblivious to the fact that the data is being striped across multiple physical drives, since the RAID logical volume appears as a physical storage device. However, there can be significant performance implications depending on whether the OS data blocks are aligned with the RAID strips. For optimal storage system performance, data for small OS read or write requests (of the OS-native 4 KB or 16 KB block size) typically do not span multiple physical drives. Misaligned data placement can occur where OS blocks span multiple RAID strips, thereby causing multiple physical drives to be accessed (assuming the RAID volume spans multiple drives).

Figure 5A:
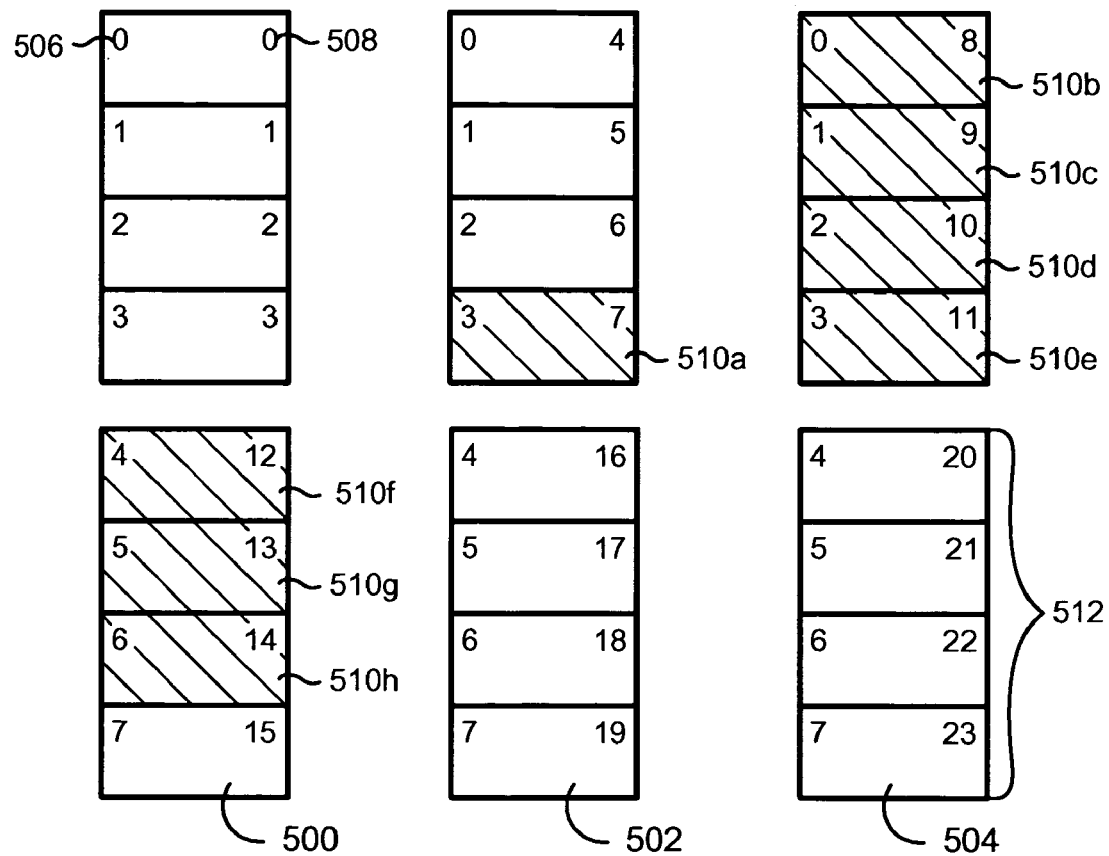
FIGS. 5A and 5B depict placement of the OS data on a logical drive, before and after the alignment adjustment process in one embodiment of the present invention.

FIG. 5A represents an example of a RAID volume before manipulation by one embodiment of the present invention. The RAID volume in FIG. 5A consists of three physical drives with poorly aligned OS data, and an inefficiently configured strip size. Referring to FIG. 5A, each of the columns 500, 502, and 504 represent a physical drive. Each cell in the columns represents a data block on the physical drive. The number in the upper left of each cell 506 represents the physical block number for the drive. The number in the upper right of each cell 508 represents the logical block number of the RAID drive as seen by the OS. In this example, the RAID strip size is configured to be 4 disk blocks 512, so strip 0 consists of logical blocks 0-3, strip 1 consists of logical blocks 4-7, etc. Cells 510*a*-510*h* represent one OS data block, which is also the very first OS data block. Since this OS data block consists of 8 physical blocks, the OS native block size is 8 disk blocks.

It can be seen in FIG. 5A that in order for the OS to read the very first OS data block, which consists of the 8 disk blocks 510*a*-510*h*, it must read logical block 7 (510*a*), from the second physical disk drive 502, logical blocks 8-11 (510*b*-510*e*) from the third physical disk drive 504, and logical blocks 12-15 (510*f*-510*h*) from the first physical disk drive 500. Since this one OS read request involves access to three different physical disk drives, it is clearly an inefficient way to access the data from the RAID volume. By adjusting the offset of the OS data and adjusting the RAID strip size, as shown in FIG. 5B, a more efficient data flow can be achieved.

Figure 5B:
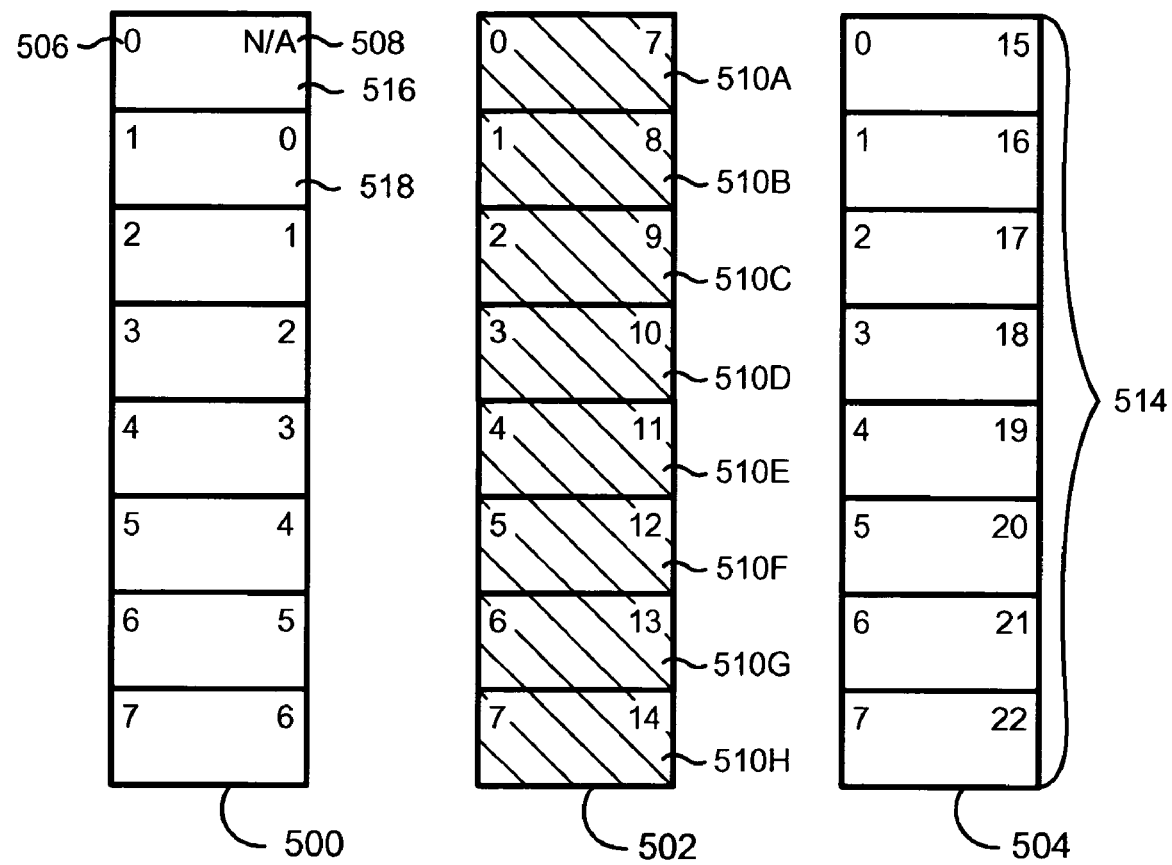

FIG. 5B represents the same RAID volume in FIG. 5A, but after a data realignment and a RAID strip size adjustment has occurred. The strip size has been changed to 8 disk blocks 514, to match the OS native block size. Additionally the mapping of logical block numbers to physical block numbers has been shifted up one block by re-mapping the logical blocks to begin at physical block 1 of the first physical drive 500 rather that at physical block 0. Now the logical blocks begin on the second block of the first physical drive 518, and the first block of the first physical drive 516 is ignored. The result of shifting the logical blocks is that now the start of the OS data, represented by cell 510*a*, aligns perfectly with the beginning of the second physical disk drive 502. As FIG. 5B shows, the combination of shifting the offset of the OS data and changing the strip size results in the first OS data block, represented by cells 510*a*-510*h*, fitting entirely within one physical disk drive. In this new configuration, when the first OS data block is requested only one physical drive needs to be accessed instead of three as in the previous configuration. This is a much more efficient data storage and retrieval configuration than was the case previous to the alignment and strip size adjustment.

Embodiments of the present invention solve this problem by improving RAID controller performance by 1) Determining statistically the OS block size and misalignment from incoming host requests, and 2) Automatically adjusting the block size and boundaries of the drive array to compensate, without requiring a virtual-block-address to physical-block-address translation table.

In one embodiment of the invention, determining the OS block size and misalignment is implemented as additional functions in the RAID firmware. Referring back to FIG. 3, functions in steps 324, 326 and 328 are added. A request to the parser is made (step 312) upon each request from the host to call function to log request stats (step 324). To gather statistical data which will be used to determine the OS block size, function to log request stats (step 324), updates a table in a portion of the firmware RAM. The number of requests made by the host computer system for a range of different I/O sizes can be tracked in a request table.

Figure 6A:
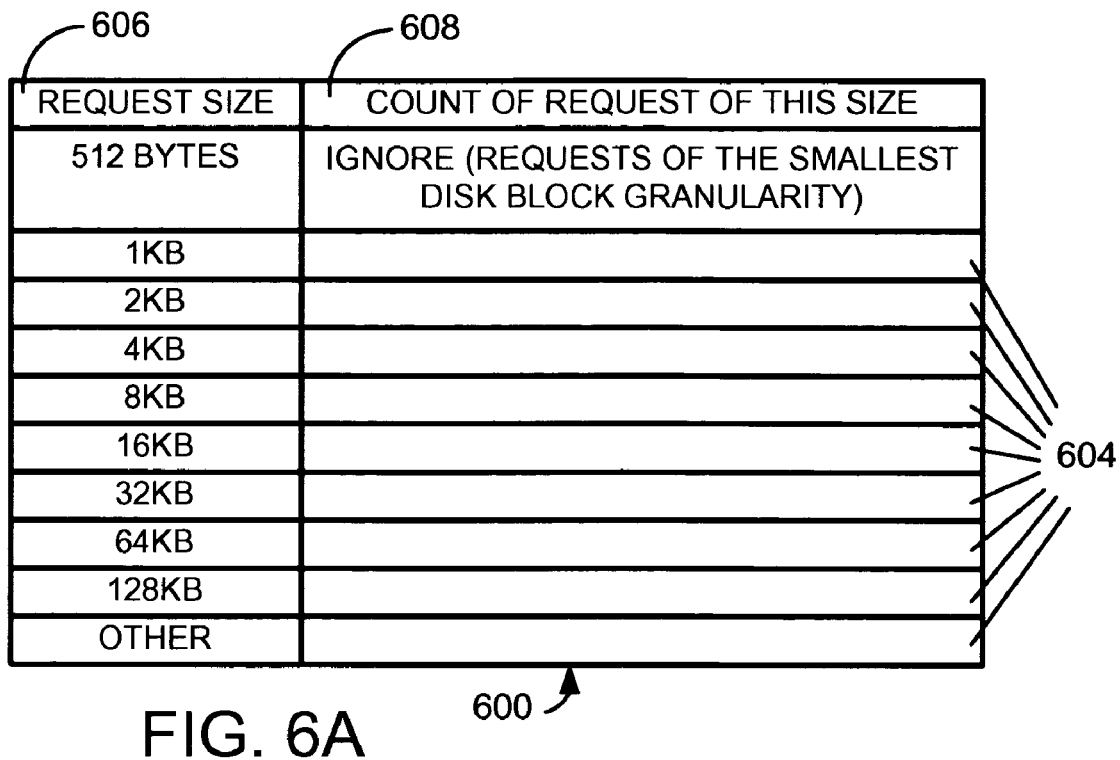
FIGS. 6A and 6B depict two tables of data which track statistical information related to host requests for one embodiment of the current invention.
Figure 6B:
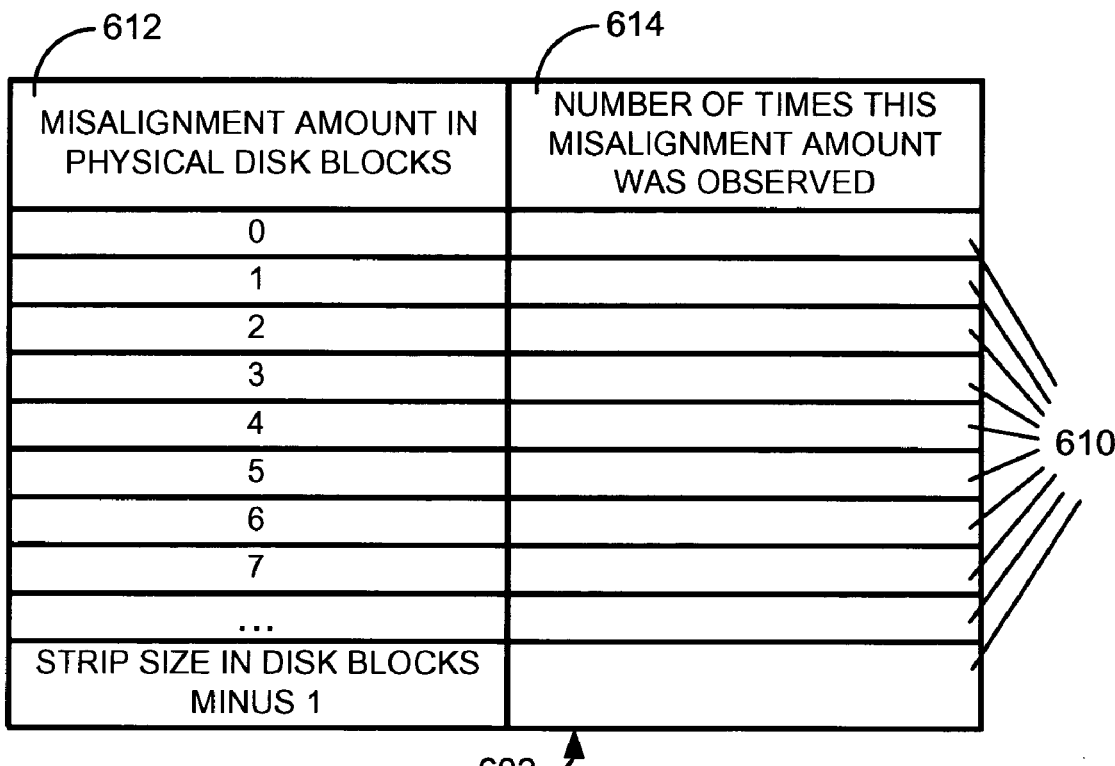

Referring to FIGS. 6A and 6B, table 600 is an array of counters 604 which in one embodiment of the present invention are implemented in Random Access Memory (RAM) accessible by the firmware. Column 606 in table 600 represents the range of possible I/O request sizes that can be issued by the host computer system, while column 608 in table 600 represents the number of requests made by the host computer system for each of the possible I/O request sizes. Upon receiving the requests from the host, the counter for that particular I/O size is incremented.

To gather statistical data which will be used to determine the block misalignment, function 324 of FIG. 3 updates the request table in a portion of the firmware RAM. Referring to FIGS. 6A and 6B, table 602 represents a count of misalignment amounts expressed in physical disk blocks for I/O requests from the host. Determining the misalignment in one embodiment of the present invention is accomplished by ignoring very small requests, such as those smaller than half of the most prevalent block size in table 600. Of the remaining requests, the RAID controller would then calculate the misalignment amount as the starting block number of the host request modulo the most prevalent block size in table 600. The counter corresponding to this misalignment amount is then incremented in table 602. The statistical data accumulated and stored in the request tables is constantly being evaluated by a background task, which is implemented by the firmware.

Referring to FIG. 3, the check for optimal alignment step 326 is periodically called by the background task step 328. Using the data in tables 600 and 602 of FIGS. 6A and 6B, the check for optimal alignment step 326 determines if the vast majority of host requests have the same misalignment amount. If this value can be determined, the check for optimal alignment step 326 will also try to determine the OS block size. If these two values can be determined, and are different from the current configuration, re-alignment can begin.

Alignment adjustment modifies the RAID strip size and alignment such that the OS data will be more optimally strip-aligned. In one embodiment of the current invention, a spare strip would be reserved at the end of the logical volume and hidden from the OS. The size of this spare strip should ideally be as large as the maximum strip size. Upon approval from the system operator (or automatically if so enabled), all of the OS data would be relocated by a small adjustment amount (from 1 to StripSize-1 disk blocks, i.e. the misalignment amount determined above).

Figure 7:
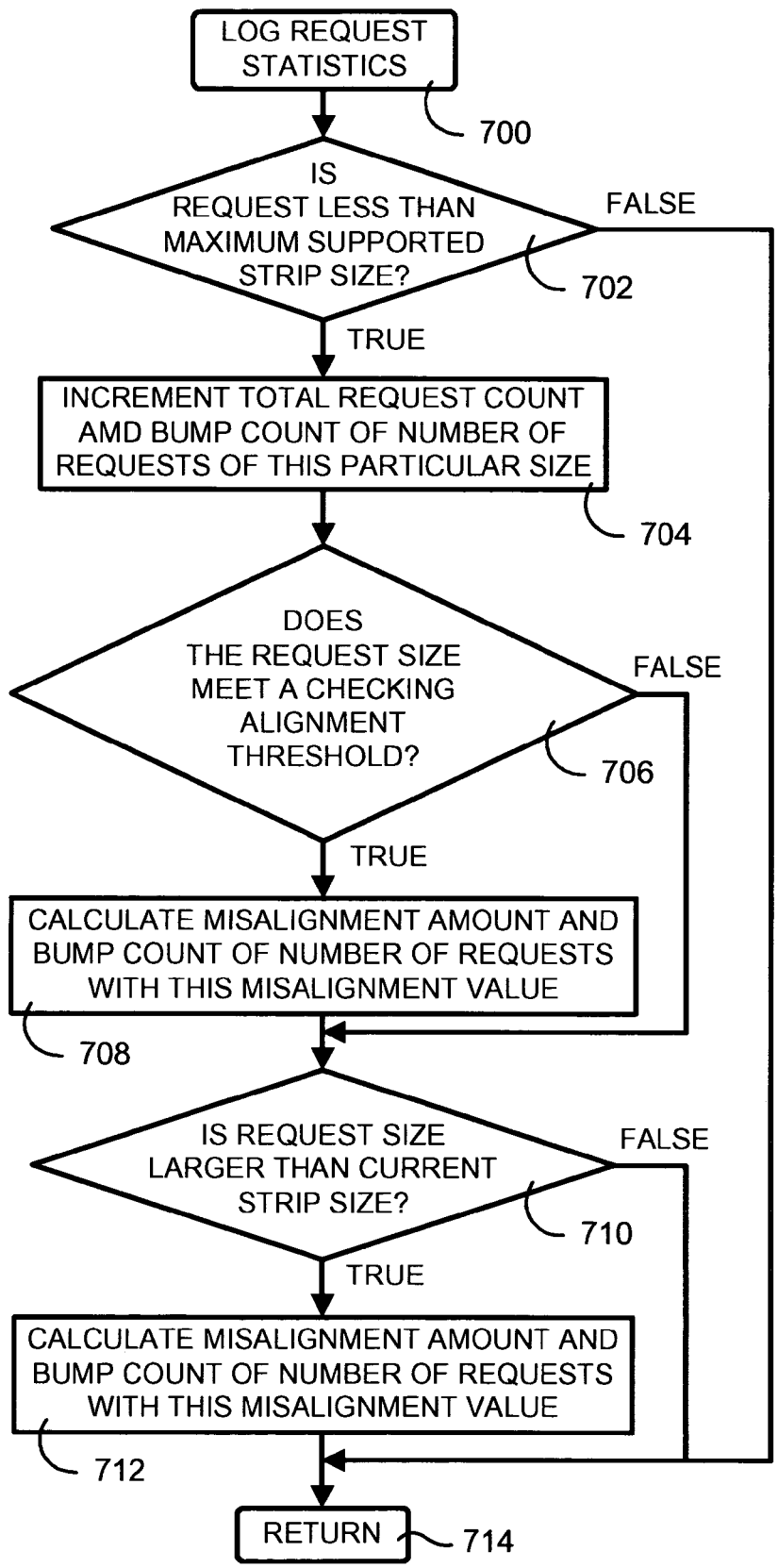
FIG. 7 is a flow chart of a software routine, which monitors and logs statistical information relating to operating system (OS) data requests in one embodiment of the present invention.

FIG. 7 is a flow diagram of the routine represented by the log request stats step 324 of FIG. 3. Log Request Statistics is called by the firmware with the host requested block size as one of its parameters (step 700). The requested block size is compared against the maximum supported strip size (step 702), if the requested block size is greater than the maximum supported strip size, the routine returns with no further processing (step 714). Otherwise the total request count is incremented, and the count of requests of this block size is incremented (step 704). The requested block size is then compared to a predetermined checking alignment threshold value step 706). The value for which the block size is compared with is configurable and is preferably set to be the smallest possible block size used by the OS. If it is, the misalignment amount is calculated as the starting block number of the host request modulo the most prevalent block size in table 600, and the count of requests with this misalignment is incremented (step 708). Otherwise this calculation is skipped over (step 708). The requested block size is compared to the current strip size (step 710), if it is larger, then the misalignment amount is calculated and the count of requests with this misalignment is incremented (step 712). Otherwise the calculation step 712 is skipped. The routine then returns (step 714).

Figure 8A:
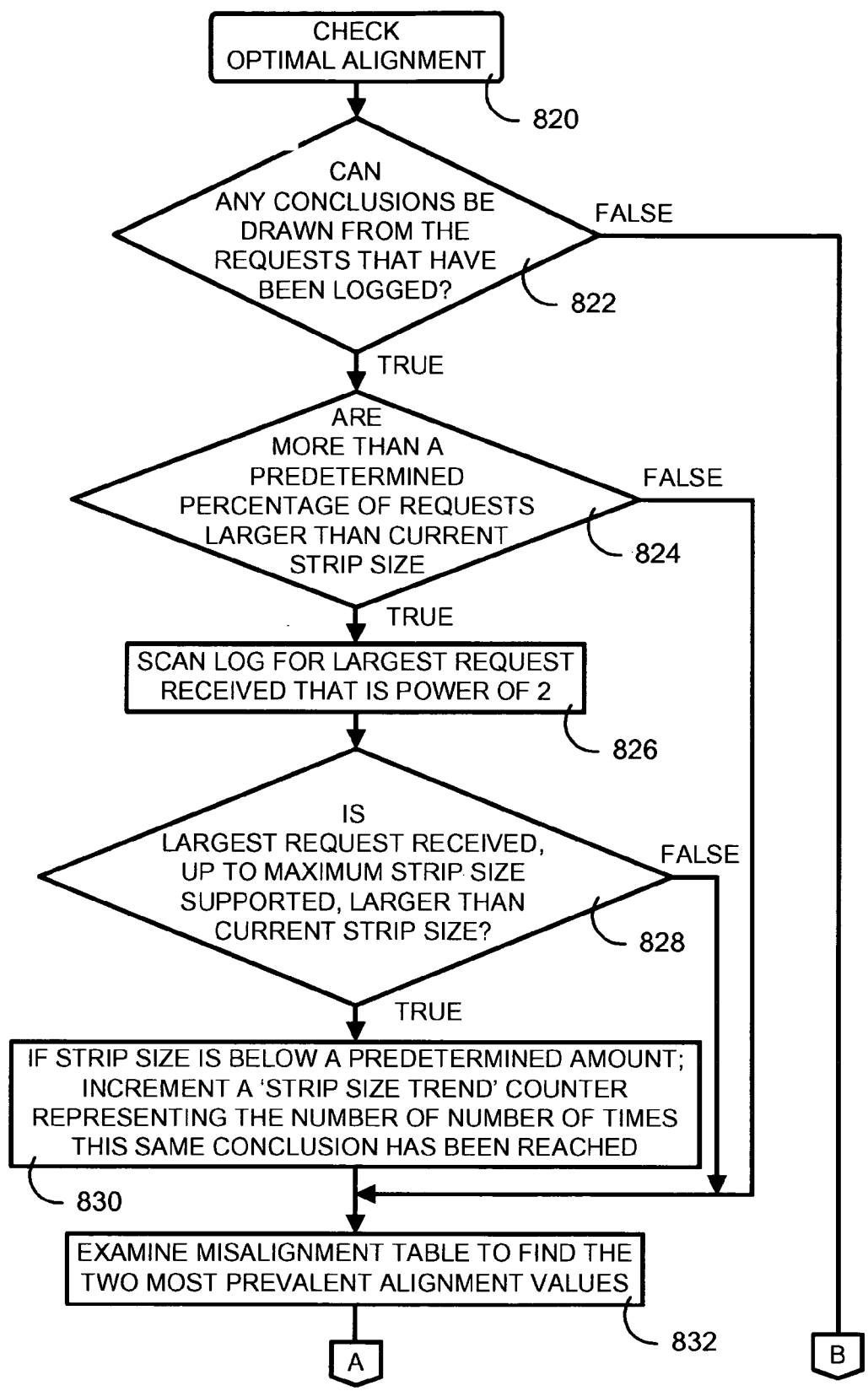
FIGS. 8A and 8B illustrate a flow chart of a routine, which analyzes logged statistical data in one embodiment of the present invention.

FIG. 8A is a flow diagram of the routine represented by the check for optimal alignment function of step 326 of FIG. 3. Check for optimal alignment function is called periodically by a background task running in the firmware of the RAID controller (step 820). The check optimal alignment routine uses several configurable tuning parameters, which in one embodiment of the present invention are selectable via a configuration utility, which is most likely executed when the logical drive was configured i.e. at the same time other configuration parameters are selected such as the RAID level, drive count, strip size, and whether this automatic alignment process is enabled. Default values may be provided by the configuration program based on past performance analysis results.

Figure 8B:
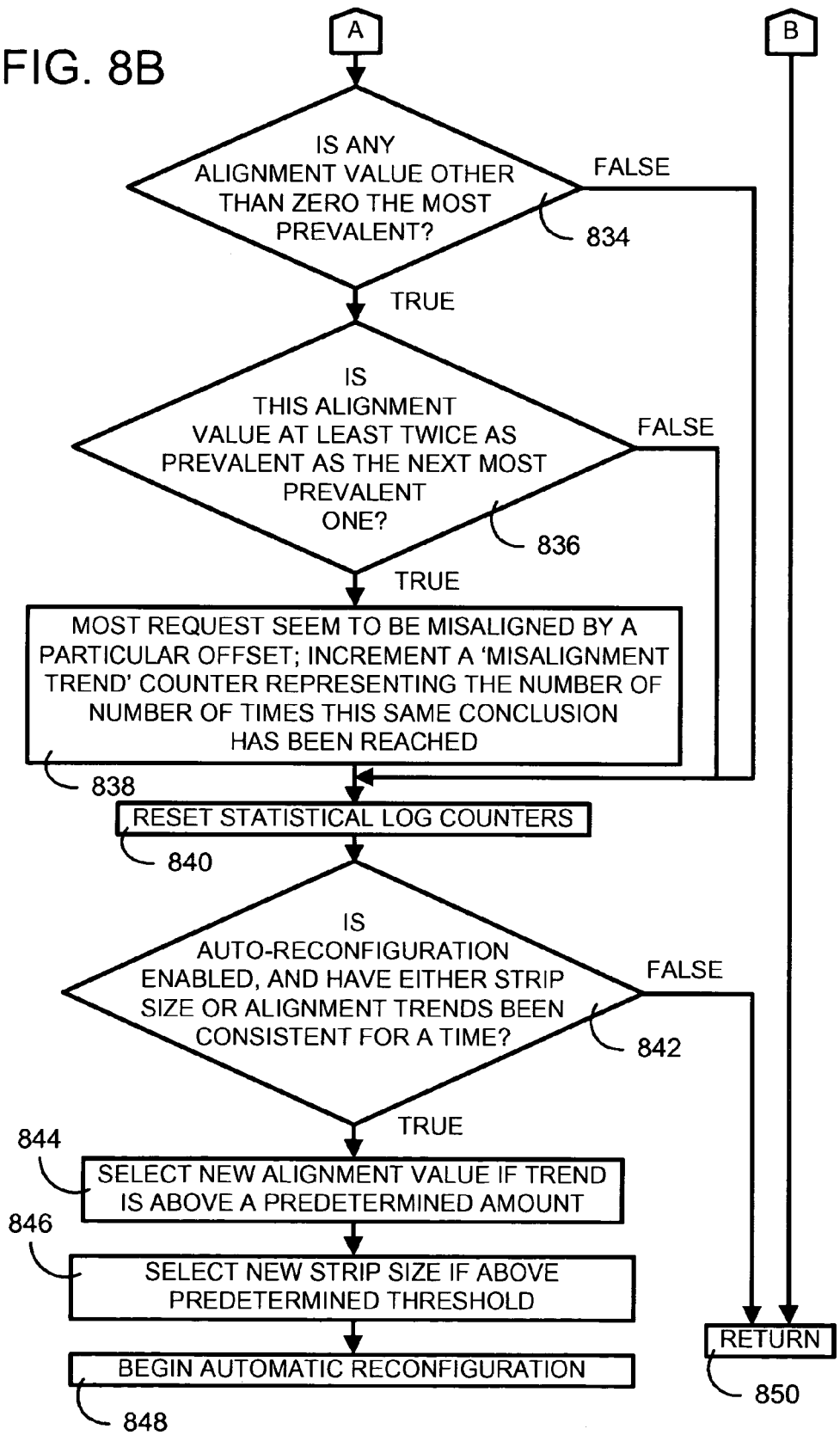

The number of requests logged (by the Log Statistics Routine) is then checked to see if there have been a predetermined threshold number of requests logged (one of the configurable tuning parameters) to draw any conclusions (step 822), if not the routine returns with no further processing (step 850 of FIG. 8B). If a predetermined number of threshold requests have been logged, it is determined if more than the predetermined number of threshold requests are larger than the current strip size (step 824), for example five percent (5% represents one of the configurable tuning parameters, whose value could be configured higher or lower), if this is false, the routine advance to step 832. If this is true, the log is scanned for the largest request received that is a power of two (step 826). This largest request received size is compared to the current strip size (step 828). If it is larger, a suitable counter, such as a strip size trend counter can be incremented, which in one embodiment of the present invention is implemented in Random Access Memory (RAM) accessible by the firmware and represents the number of consecutive times this conclusion has been reached (step 830). If it is not larger, the routine advances to step 832. If it is larger, the misalignment table is examined to find the two most prevalent values (step 832).

Referring to FIG. 8B, the two alignment values are checked to see if any alignment value other than zero is the most prevalent (step 834), if not, the routine advances to (step 840). If any alignment value other that zero is most prevalent, the most prevalent alignment value is checked to see if it is at least twice as prevalent as the next most prevalent one (step 836). It should be noted that twice as prevalent is a configurable tuning parameter which could be set to other values, i.e. three times as prevalent or 1.5 times as prevalent. If more than zero alignment value is prevalent, then a misalignment trend counter, which in one embodiment of the present invention is implemented in Random Access Memory (RAM) accessible by the firmware and representing the number of times, this conclusion has been reached and a counter is incremented (step 838). The log counters for all of the data collected thus far, with the exception of the misalignment trend counter and strip size trend counter, are reset (step 840).

Auto-reconfiguration is then checked to see if it's enabled and if either the misalignment trend counter or the strip size trend counter are larger than a predetermined threshold value (step 842). The threshold value would be determined by frequency at which the check optimal alignment 820 function is called by the background task. If auto-reconfiguration is disabled, then the system returns (step 850). If the misalignment trend count is above a predetermined threshold value, the system selects the new alignment value (step 844). Also, if the strip size trend count is above a predetermined threshold, the system selects the new strip size (step 846) and the automatic reconfiguration process begins (step 848).

Figure 9:
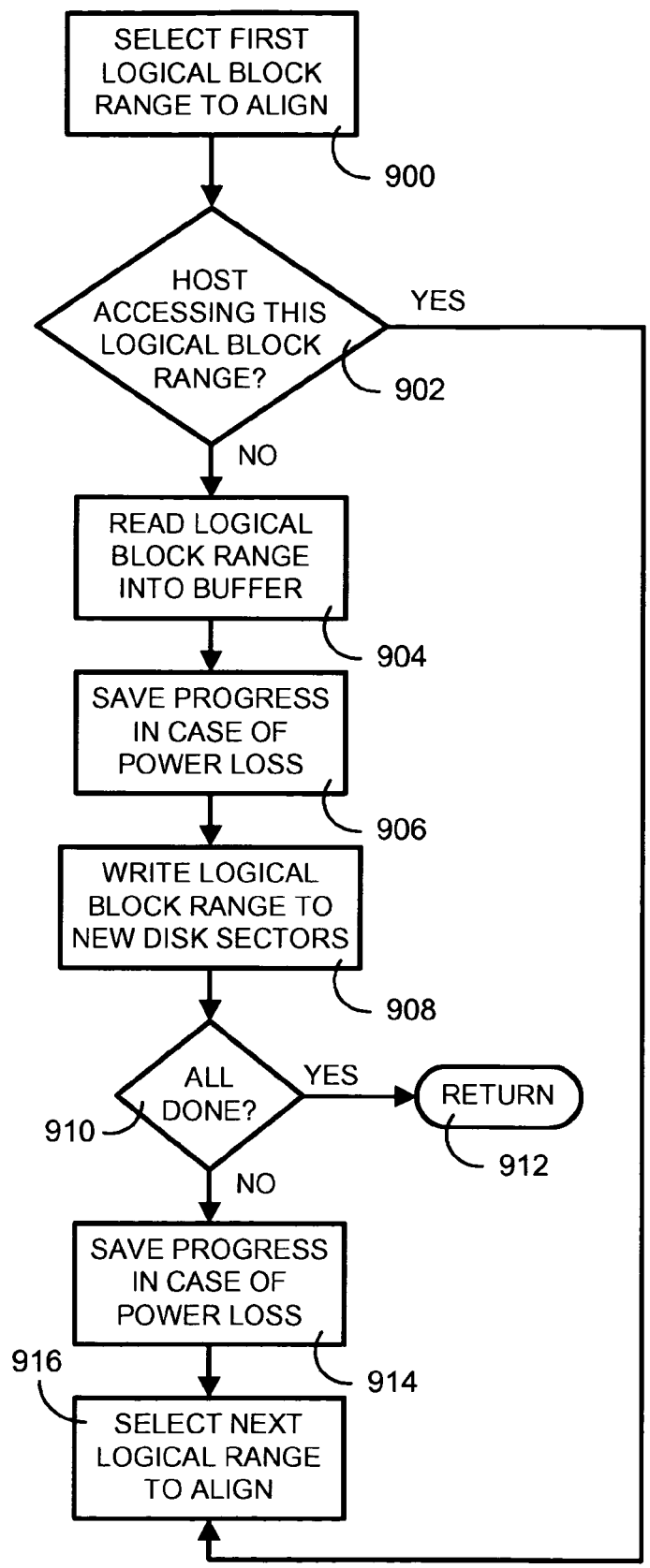
FIG. 9 is a flow chart of a software routine which performs the on-line RAID volume realignment procedure in one embodiment of the present invention.

FIG. 9 is a flow diagram representing the reconfiguration process implemented in firmware in an embodiment of the present invention, which is called to perform strip realignment and/or strip size adjustment. Referring to FIG. 9, the process begins by selecting the first logical block range to process (step 900). The size of the block range to process is normally selected such that it is equal to or a multiple of the Least Common Denominator of the original stripe size and the new stripe size (where stripe size is defined as the strip size multiplied by the number of data drives in the array). In addition, the order that the block ranges are copied (top down vs. bottom up) is chosen based on whether the new alignment adjustment is higher or lower than the previous alignment adjustment so that data that has yet to be aligned is not inadvertently overwritten. A table representing the logical blocks currently being accessed by the host is checked against the logical block range that is currently being realigned. This table, which in one embodiment of the present invention is implemented in Random Access Memory (RAM) accessible by the firmware, is updated upon each host request to reflect all logical blocks which are currently being accessed by the host system. This checking continues until the logical block range currently being realigned does not overlap the logical blocks currently being accessed by the host (step 902).

The data from the logical block range currently being realigned is then read into a buffer, which in one embodiment of the present invention is implemented in Random Access Memory (RAM) accessible by the firmware (step 904). The progress is stored in non-volatile memory in case of a power failure (step 906). In one embodiment of the present invention, both the data buffer RAM and the progress data are stored in non-volatile (battery-backed) RAM so that both data and progress are protected against power failure. Storing the progress made allows the reconfiguration to continue at the point where it left off in the case where power to the system is lost and the system needs to be restarted. Next the buffer containing the data just read is written to the new disk sectors in its new and more optimally aligned format (step 908). If the logical block range which has just been realigned is the last to require realignment (step 910), the reconfiguration process is complete and the process returns (step 912). If there are more logical blocks left to realign, the progress made so far is again stored to non-volatile memory (step 914), the next logical block range to realign is selected (step 916), and the realignment process continues (step 902).

Figure 10:
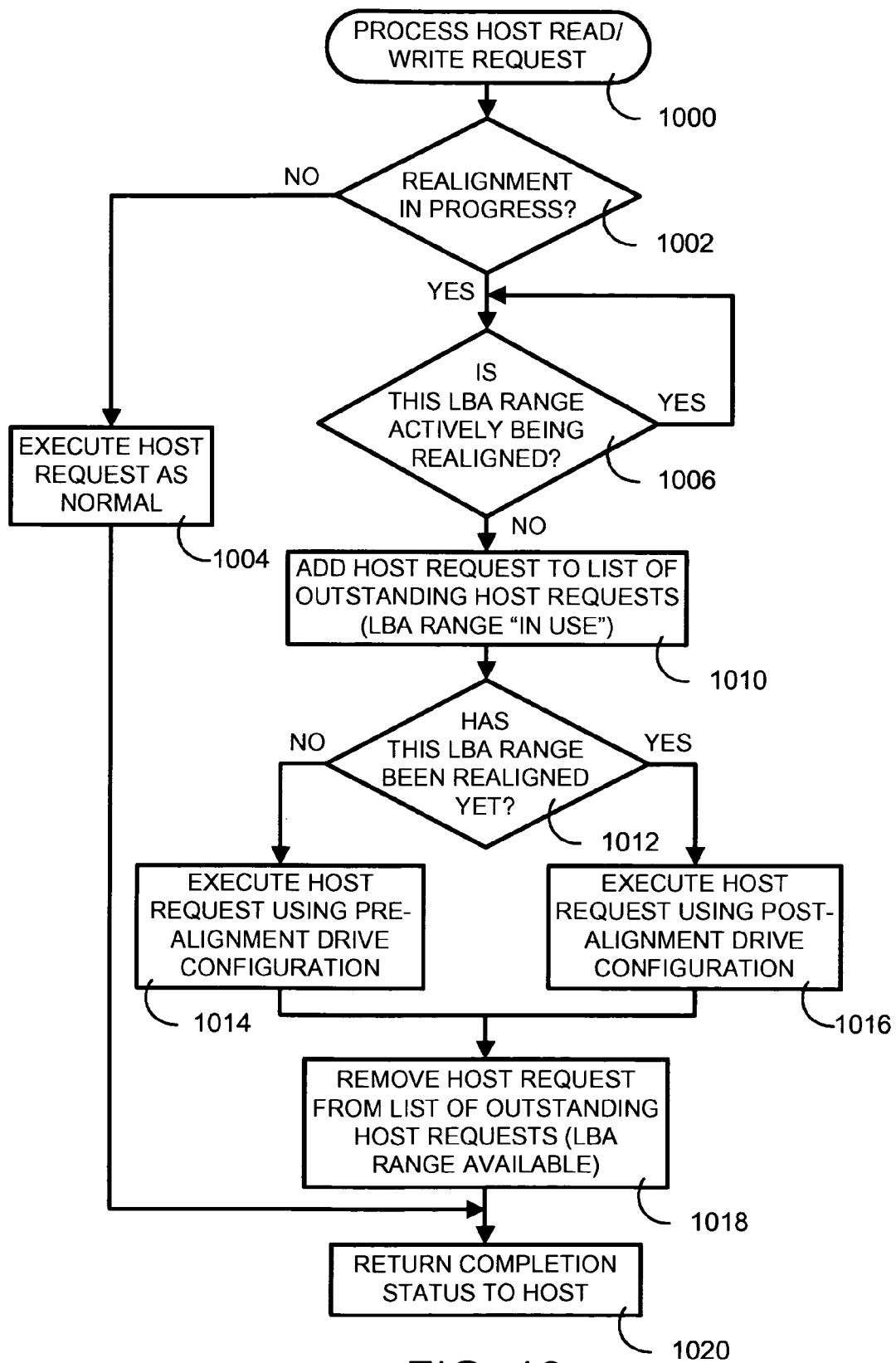
FIG. 10 is a flow chart of software routine that handles the processing of host read/write requests to the RAID volume while an on-line reconfiguration process is taking place, in one embodiment of the present invention.

Since the realignment process can be performed on-line, while the host operating system could be simultaneously running multiple independent software programs all requiring constant access to the mass storage drive array subsystem, access during the realignment process must be strictly coordinated to ensure that access to any logical blocks currently being realigned does not result in invalid data being returned to the host. FIG. 10 is a flow diagram representing a function which handles read/write requests made by the host operating system, which in one embodiment of the present invention is implemented in firmware, and is called upon every read/write request made by the host operating system. Referring to FIG. 10, a read/write request from the host is received (step 1000). A check is done to see if a realignment is currently in progress (step 1002), if a realignment is not currently in progress the host request is executed as normal, meaning the data is read or written as normal to the mass storage drive array subsystem without any special handling, which would be required during a realignment, and the function returns a completion status to the host as normal (step 1020). If realignment is currently in progress, the logical block range which the host is currently attempting to access is checked against the logical block range that is currently being realigned. This checking is continued until the logical block ranges being accessed by the host don't overlap with the logical block ranges currently being realigned by the background realignment process (step 1006). At this point the logical block range being requested by the host is added to a table which contains a list of all the logical blocks which are currently being accessed by the host system. This table is accessed by the background realignment process to coordinate access to the mass storage drive array subsystem and was described previously. Since the drive array subsystem is currently in the process of realignment, a check is made to determine if the logical blocks being accessed by the host have been realigned yet (step 1012). If the logical blocks have not been realigned yet, the host request is executed using pre-alignment drive configuration (step 1014). If the logical blocks have already been realigned, the host request is executed using post-alignment drive configuration (step 1016). Next, the logical block range which was requested by the host, and just processed, is removed from the table of logical blocks being accessed by the host system (step 1018), and a completion status is returned to the host (step 1020).

Thus, the embodiments of the present invention solve the problem of performance loss in typical RAID systems by determining statistically the OS block size and misalignment from incoming host requests, and automatically adjusting the block size and boundaries of the drive array to compensate. The embodiments of the present invention accomplish the above without requiring a virtual-block-address to physical-block-address translation table.

The foregoing has described the principles, embodiments and modes of operation of the present invention. However, the embodiments of the present invention should not be construed as being limited to the particular embodiments discussed. The above-described embodiments should be regarded as illustrative rather than restrictive, and it should be appreciated that variations may be made in those embodiments by workers skilled in the art without departing from the scope of the embodiments of the present invention as defined by the following claims.

The invention claimed is:

1. A data misalignment correction method for a mass storage drive array subsystem coupled to a computer operating system having input/output data block requests, comprising:
   automatically determining an amount of misalignment between a requested data block and a current data block alignment configuration;
   using the amount of misalignment to determine a preferred data block alignment; and
   realigning data block requests on the mass storage device according to the preferred data block alignment.

2. The method of claim 1, further comprising logging information relating to the operating system's data requests.

3. The method of claim 2, using the logged information for calculating a misalignment value.

4. The method of claim 1, further comprising determining whether the data requests are greater than a maximum supported strip size.

5. The method of claim 1, further comprising determining whether the data requests are greater than a current strip size.

6. The method of claim 4, further comprising determining misalignment if the data requests are greater than the maximum supported strip size.

7. The method of claim 1, wherein automatically determining further comprises ignoring requests that are smaller than a predefined value.

8. The method of claim 1, further comprising using battery-backed random access memory (RAM) to protect against power loss during realignment.

9. The method of claim 1, wherein automatically determining further comprises using a predefined alignment table to find prevalent alignment values.

10. The method of claim 1, further comprising determining strip size by selecting new alignment values if alignment trends are above a predefined threshold value.

11. The method of claim 1, wherein the data misalignment correction method is incorporated in at least one of software, integrated into a host computer system, an expansion card or firmware located in the mass storage system.

12. A data misalignment correction device for a mass storage drive array subsystem, comprising:
   logic for receiving from an operating system request for data blocks;
   a misalignment detection device configured to automatically determine an amount of misalignment between a requested data block and a current data block alignment configuration and using the amount of misalignment to determine a preferred data block alignment; and
   a realignment device configured to realign data block requests on the mass storage device according to the preferred data block alignment.

13. The data misalignment correction device of claim 12, wherein the misalignment detection device is further configured to determine strip size by automatically selecting new alignment values if alignment trends are above a predefined threshold value.

14. The data misalignment correction device of claim 12, wherein the misalignment detection device is further configured to determine whether the data requests are greater than a maximum supported strip size.

15. The data misalignment correction device of claim 12, wherein the misalignment detection device is further configured to determine whether the data requests are greater than a current strip size.

16. The data misalignment correction device of claim 12, wherein the misalignment detection device includes a logger configured to log information relating to the operating system's data requests.

17. The data misalignment correction device of claim 14, wherein the logger uses the logged information to calculate a misalignment value.

18. The data misalignment correction device of claim 12, wherein the misalignment detection device is configured to ignore requests that are smaller than half of a selected mass storage strip size.

19. The data misalignment correction device of claim 12, wherein the misalignment detection device and the realignment device are programmed to operate in a computer readable medium using computer operable instructions.

20. The data misalignment correction device of claim 12, wherein the misalignment detection device and the realignment device are incorporated in at least one of software, integrated into a host computer system, an expansion card or firmware located in the mass storage system.

21. A data misalignment correction system, comprising:
   means for automatically determining an amount of misalignment between a requested data block and a current data block alignment configuration;
   means for using the amount of misalignment to determine a preferred data block alignment; and
   means for realigning data block requests on the mass storage device according to the preferred data block alignment.

22. The data misalignment correction device of claim 21, further comprising means for logging information relating to the operating system's data requests.

23. The data misalignment correction device of claim 22, further comprising means for using the logged information for calculating a misalignment value.

24. The data misalignment correction device of claim 21, further comprising means for ignoring requests that are smaller than a predefined value.

25. The data misalignment correction device of claim 21, wherein the misalignment detection device and the realignment device are incorporated in at least one of software, integrated into a host computer system, an expansion card or firmware located in the mass storage system.

26. A misalignment correction method, comprising:
   receiving from an operating system requests for data blocks;
   determining an amount of misalignment between a requested data block and a current data block alignment configuration;
   ignoring requests that are smaller than a predefined value;

logging information relating to the operating system's data requests for calculating a misalignment value; and using the amount of misalignment to determine a preferred data block alignment.

27. The method of claim 26, further comprising determining misalignment if the data requests are greater than the maximum supported strip size.

28. The method of claim 26, where the predefined value is smaller than half of a selected mass storage strip size.

29. The method of claim 26, wherein automatically determining further comprises using a predefined alignment table to find prevalent alignment values.

30. The method of claim 26, wherein the misalignment correction method is incorporated in at least one of software, integrated into a host computer system, an expansion card or firmware located in the mass storage system.

* * * * *